(12) United States Patent
Lajolo et al.

(10) Patent No.: US 7,784,046 B2
(45) Date of Patent: Aug. 24, 2010

(54) AUTOMATICALLY BOOSTING THE SOFTWARE CONTENT OF SYSTEM LSI DESIGNS

(75) Inventors: Marcello Lajolo, Princeton, NJ (US); Kanishka Lahiri, New York, NY (US); Srimat T. Chakradhar, Manalapan, NJ (US); Abhishek Mitra, Riverside, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 1365 days.

(21) Appl. No.: 11/237,017

(22) Filed: Sep. 28, 2005

(65) Prior Publication Data

US 2006/0236300 A1   Oct. 19, 2006

Related U.S. Application Data

(60) Provisional application No. 60/671,609, filed on Apr. 15, 2005.

(51) Int. Cl.
G06F 9/44 (2006.01)
(52) U.S. Cl. .................. 717/172; 717/168; 717/174; 716/18
(58) Field of Classification Search ......... 717/168–178, 717/100; 703/13, 14; 716/1, 11, 18
See application file for complete search history.

(56) References Cited

U.S. PATENT DOCUMENTS

| 5,937,184 A * | 8/1999 | Rao ........................... 703/20 |
| 6,698,017 B1 * | 2/2004 | Adamovits et al. .......... 717/168 |
| 6,856,951 B2 * | 2/2005 | Moona et al. ................. 703/22 |
| 7,069,204 B1 * | 6/2006 | Solden et al. ................ 703/14 |
| 2006/0037008 A1 * | 2/2006 | Stelzer et al. ............... 717/136 |

OTHER PUBLICATIONS

Frank Vahid, The Softening of Hardware; IEEE, 2003, pp. 27-34.*
Keutzer et al., Hardware-Software Co-Design and ESDA; ACM, 1994, pp. 435-436.*

* cited by examiner

Primary Examiner—Wei Y Zhen
Assistant Examiner—Satish Rampuria
(74) Attorney, Agent, or Firm—James Bitetto; Joseph Kolodka

(57) ABSTRACT

The invention is an efficient system and method for re-partitioning an existing system-level design by boosting the fraction of system functionality that is implemented using embedded software. The invention comprises automated techniques for identifying hardware targets to be softened and techniques for automatically generating a new system-level architecture having a new hardware/software boundary.

9 Claims, 14 Drawing Sheets

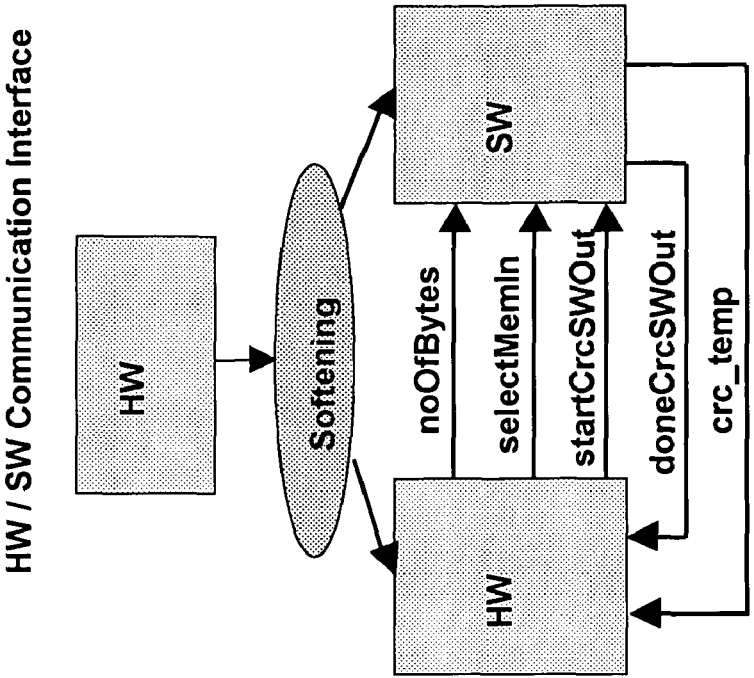

```
doneCrcCalcOut = 0;
wait(startCrcIn);
noOfBytes = bufferSizeIn;
```

■ HW/SW I/F variables

```
/*SW-BEGIN*/
crc_temp = 0xFFFFFFFF; //Initialize the CRC
index = (crc_temp >> 24) & 0xFF;
crc_temp = (crc_temp << 8) ^ crc_table[index];
i=0;
while ( i < noOfBytes)
{
    if (selectMemIn == 0)
        data = plainText[i];
    else if (selectMemIn == 1)
        data = cipherText[i];
    index = ((crc_temp >> 24) ^ data) & 0xFF;
    crc_temp = (crc_temp << 8) ^ crc_table[index];
    i=i+1;
}
wait(1);
crc_temp = crc_temp ^ 0xFFFFFFFF;
/*SW-END*/ crcOut = crc_temp;
doneCrcCalcOut = 1;
```

```
#define noOfBytesIn (__ABS_MEMORY+0x8000)
#define crc_temp (__ABS_MEMORY+0x8002)
#define noOfBytes (*v_noOfBytesIn)
#define crc_temp (*v_crc_tempOut)
#define wait(d)
void GetCrcSW(){
    v_noOfBytesIn = (short int *) noOfBytesIn;
    v_selectMemInIn = (short int *) selectMemInIn;
    v_crc_tempOut = (int *) crc_tempOut;
    v_doneGetCrcSWOut = (short int *) doneGetCrcSWOut;
    ...
    {
    /*SW-BEGIN*/
    int index = 0; int i = 0;
    int crc_temp = 0;
    crc_temp = 0xFFFFFFFF;  /*Initialize the CRC*/
    index = ((crc_temp >> 24) ^ data) & 0xFF;
    crc_temp = (crc_temp << 8) ^ crc_table[index];
    i=i+1;
    }
    wait(1);
    crc_temp = crc_temp ^ 0xFFFFFFFF;
    * v_doneGetCrcSWOut = ONE;
    /*SW-END*/ }
}
```

- Pointer declarations for memory mapped interface variables
- Pointer de-referencing for arithmetic/logic ops
- Translation of HW specific constructs

FIG 7

| Softening Candidate(s) | Application-Specific Logic (sq. um) | Performance | | Throughput (Mbps) |
|---|---|---|---|---|
| | | Hardware Block | Softened Task | |
| *None (all HW)* | 80308 | | | 173.1 |
| *MIC* | 79373 | 2.61 cycles/byte | 13.82 cycles/byte | 173.1 |
| *ICV* | 82278 | 5.0 cycles/byte | 20.0 cycles/byte | 173.1 |
| *TKIP Phase 1* | 60332 | 264 cycles | 8664 cycles | 173.1 |
| *TKIP Phase 2* | 64877 | 69 cycles | 1220 cycles | 173.1 |
| *Wep_Init* | 64785 | 1794 cycles | 20203 cycles | 86.7 |
| *Wep_Encrypt* | 77925 | 16.62 cycles/byte | 155.0 cycles/byte | 20.4 |
| *FCS* | 72278 | 5.0 cycles/byte | 20.0 cycles/byte | 173.1 |
| SA1 | 25936 | | | 163.0 |
| SA2 | 25936 | | | 86.8 |
| SA3 | 29378 | | | 84.1 |
| *SA4(all SW)* | 0 | | | 13.9 |

FIG 10

| Arch. | Computational Effort in Softening | | | Hardware Synthesis | |
|---|---|---|---|---|---|
| | SOFTENIT (sec) | Compilation (sec) | Total (sec) | HLS (sec) | Logic Synthesis (sec) |
| SA1 | 14.2 | 19.9 | 34.1 | 2.91 | 308 |
| SA2 | 13.8 | 19.9 | 33.7 | 2.91 | 308 |
| SA3 | 12.7 | 14.5 | 27.2 | 14.7 | 282 |
| SA4 | 16.2 | 35.7 | 51.9 | 15.88 | 423 |

FIG 12

AUTOMATICALLY BOOSTING THE SOFTWARE CONTENT OF SYSTEM LSI DESIGNS

This application claims priority to and is a nonprovisional application of U.S. Provisional Patent Application Ser. No. 60/671,609, entitled "AUTOMATICALLY BOOSTING THE SOFTWARE CONTENT OF SYSTEM LSI DESIGNS," filed on Apr. 15, 2005, the contents of which are incorporated by reference herein.

BACKGROUND

The invention relates generally to the field of embedded system-level design. More specifically, embodiments of the invention relate to systems and methods for increasing software functionality in an existing system-level design.

Embedded software typically pertains to software used in controllers for reactive real-time applications that are implemented as mixed software and hardware. These controllers comprise processors, microprocessors, microcontrollers, digital signal processors (DSPs), and the like. Examples of applications using embedded controllers include everyday appliances such as microwave ovens; consumer electronics such as cameras and compact disk players; automotive applications such as engine management and anti-lock brake controllers; telephony applications such as switches and cellular phones; plant automation and robotics, and many others.

Embedded software is the preferred choice for implementing application functionality in system large scale integration (LSI) designs due to lower design effort and silicon cost, and shorter product cycles associated with software as compared to custom hardware. For particular system functions that are subject to potential revision, embedded software helps prolong the market longevity of a product through the ability to support post-deployment upgrades and in-field fixes. However, several application processing tasks still necessitate the use of custom hardware since software alone cannot guarantee that all performance requirements are met. Most often the software component is used for flexibility while the hardware component is used for performance.

System-level design can be subject to many different types of constraints including timing, size, weight, power consumption, reliability, and cost. A system specification is developed and sent to hardware and software engineers. A hardware/software partition is decided a priori and is adhered to as much as is possible since any changes in the partition may necessitate extensive redesign. Designers often strive to make everything fit in software and off-load parts of the design to hardware to meet design constraints.

Codesign deals with designing heterogeneous systems. The designer has to exploit the advantages of the heterogeneity of the target architecture. In many instances, the use of processors is very economical compared with the development costs of application specific integrated circuits (ASICs). However, hardware is always used when processors are not able to meet the required performance. The tradeoff between hardware and software illustrates the optimization aspect of codesign.

The codesign process starts with specifying the system behavior at a system level. After this, a system specification is divided into a set of basic blocks. In a cost estimation step, values for some cost metrics are determined for the blocks. The cost metrics include estimations for hardware or software implementations. Hardware cost metrics include execution time, chip area, power consumption or testability. Software cost metrics include execution time and the amount of required program and data memory.

After the cost estimation has been performed, the hardware/software partitioning phase computes a mapping of the blocks to hardware or software resulting in sets of blocks implemented as hardware or software. Since the goal is a heterogeneous system-level architecture, the mapping requires additional interface parts such as communication and synchronization between ASICs and processors. All specifications include communication mechanisms to allow the exchange of data between processors and ASICs. The hardware is synthesized from the given system specification and the software specification is compiled for the chosen processor. The result of this co-synthesis phase is an ASIC or set of ASICs and a set of assembler programs for a processor or processors to execute. An example system-level architecture that results from this process is shown in FIG. 1.

Prior work in the area of hardware/software codesign has in large part concerned itself with optimizing the partitioning of tasks between software and hardware given a set of application tasks in conjunction with the current performance capabilities of hardware and embedded processors. However, over the market life of an application-specific product, the question of optimizing the hardware/software partition is often raised. For example, when a product undergoes revision to accommodate minor changes in application functionality or when a need arises to improve key design metrics such as performance, power, etc., in order to remain competitive. At each revision, it is important to consider evolutionary changes that would inevitably have occurred in the performance of hardware and software due to advances in semiconductor technologies and take them into account to address the question of repartitioning an existing design.

In many application domains, especially those that are affected by international standards, changes to application behavior are relatively infrequent due to the slow rate at which new standards or revisions to existing ones are approved and deployed. For example, the first revision to the encryption algorithms for IEEE 802.11 wireless local area networks (LANs) occurred more than five years after their introduction, while for over a decade, MPEG-2 (Motion Picture Experts Group, layer 2) remains the most popular video compression technique. In contrast, semiconductor technologies that underlie the implementations of these applications have historically demonstrated rapid and steady improvements in performance, silicon area, and power consumption. As a result, the capabilities of the underlying hardware are periodically observed to exceed the imposed requirements. In such scenarios, it is important to effectively exploit improvements in hardware capabilities to reduce design cost, time-to-market, and improve design flexibility. Sustained improvements in semiconductor technology allows for increased migration of system functionality from hardware to software. A natural way to achieve this goal over time is to reduce the amount of application-specific hardware used in the system and realize the same functionality using embedded software.

In order to remain competitive under rapidly evolving technology, design teams look to the gradual migration of application tasks from hardware to software. Typically, the system specification is reviewed, and using automatic codesign tools, a system architecture that is optimized for the new technology is arrived at. The problem is that a unified high-level model of the system and corresponding tool flows for architecture synthesis are often unavailable. Therefore, designers execute a near complete (manual) redesign of the system, starting with an informal specification of the application that leads to high cost and large turn-around times.

Previous work in hardware/software codesign targeted the initial design of a system architecture in which the partitioning of system functionality into hardware and software is optimized, starting from an implementation independent specification of system behavior. This is a process that requires significant investment of engineering resources and is conducted as infrequently as possible, potentially resulting in failure to capture emerging markets or failure to keep up with changing application requirements and feature sets.

The prior art has not satisfactorily addressed automatic techniques to support the migration of system functionality in the opposite direction—from hardware to software—in application scenarios where it is important to reduce hardware cost, increase flexibility, and reduce design turn-around-time without sacrificing performance.

SUMMARY

Although there are methods and processes for system codesign, a method for re-partitioning an existing system-level design by boosting the fraction of system functionality using embedded software is not available. The inventors have discovered that it would be desirable to have a system and method for migrating targeted hardware portions of an existing system-level design into software for execution on a processor or processors in a new system-level design. The invention comprises automated techniques for identifying hardware targets to be softened and techniques for automatically generating a new system-level architecture with a new hardware/software boundary.

One aspect of the invention provides methods for creating a new system-level design for an existing system-level design by migrating hardware functionality present in the existing system-level design to software in the new system-level design. Methods according to this aspect of the invention preferably start with examining the existing system-level design for hardware targets, selecting at least one hardware target, identifying interface variables for the selected hardware target and remaining existing system-level design hardware, and softening the selected hardware target for execution on at least one processor for the new system-level design.

Another aspect of the invention is consolidating the remaining existing system-level design hardware into new system-level design hardware.

Yet another aspect of the invention is generating a mixed hardware/software scheduler for the new system-level design for sequencing the execution of the softened target with the new system-level design hardware.

Other objects and advantages of the systems and methods will become apparent to those skilled in the art after reading the detailed description of the preferred embodiments.

BRIEF DESCRIPTION OF THE DRAWINGS

FIGS. 5A and 5B show an exemplary communication interface.

FIG. 7 is an exemplary CRC softened task in software.

FIG. 10 is a table showing design space usage of different softening alternatives.

FIG. 12 is a table showing computational effort of the different softening alternatives.

DETAILED DESCRIPTION OF THE PREFERRED EMBODIMENTS

Figure 1:
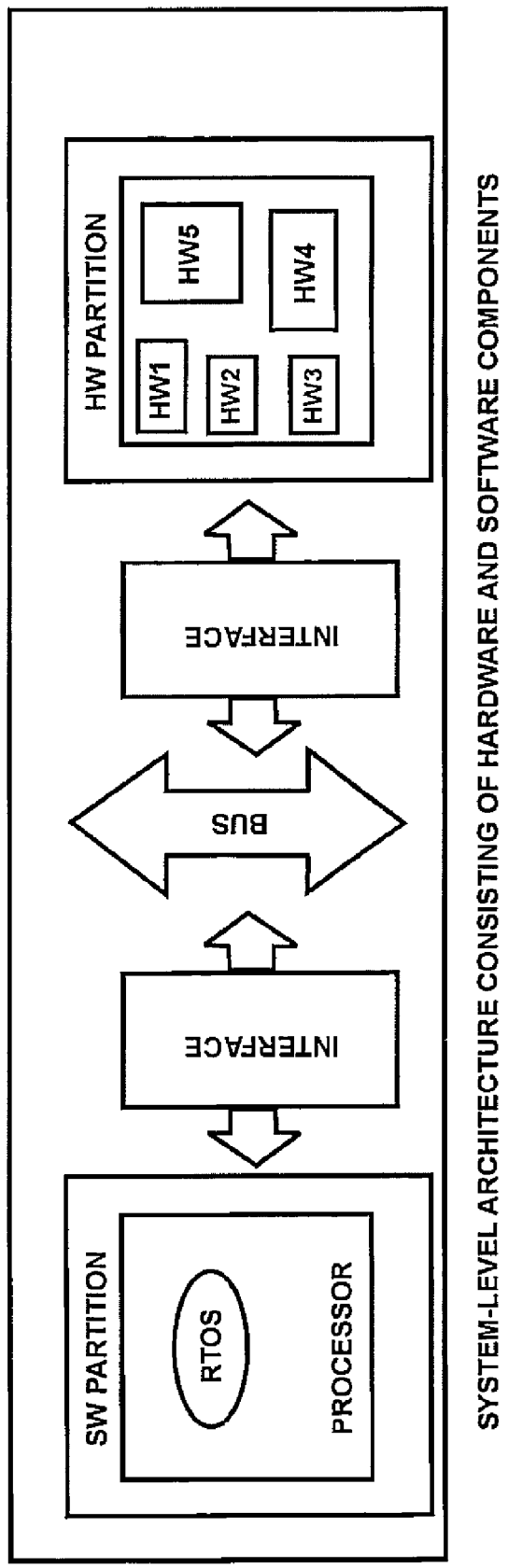
FIG. 1 is a diagram of an exemplary system-level architecture consisting of hardware and software components.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

The invention teaches an efficient and cost effective repartitioning of hardware functionality to software in system-level architectures to exploit the capabilities of improved technology. The invention reduces total time to market, a critical requirement in many system LSI market segments that are characterized by short product cycles. By automating laborious tasks such as interface design, module selection, and code generation, the invention enables faster system revisions during the market life of an application to adapt to changing market demands. By boosting software content, the invention (i) helps reduce hardware costs in terms of silicon area through reductions in application specific logic, and (ii) enables products to have a longer market life, since use of software increases the scope for post-deployment upgrades to system functionality.

The invention is a methodology for re-partitioning an existing hardware (HW) or hardware/software (HW/SW) system-level design by migrating system functionality from hardware to embedded software. This is achieved by converting targeted portions of system functionality that is implemented using dedicated hardware into optimized software running on a processor. This is referred to as "softening." The architecture that results from the system and method of the invention has reduced application-specific logic complexity, a boost in the fraction of functionality that is executed by a processor, increased flexibility, and no loss in system performance.

The method of the invention comprises two major tasks: (1) the migration of system functionality from hardware to software, and (2) the generation of interfaces and handshaking mechanisms between the remaining hardware and the new software. A designer uses the invention to aid in selecting a hardware target or targets for softening in an existing system-level architecture and applies a semi-automated program to generate a new system-level architecture. The method results in a system-level architecture with reduced complexity of application-specific logic and a boost in the fraction of system functionality that is implemented using embedded software. The method takes as input a partitioned and mapped system description which contains at least one hardware mapped task and outputs a new system architecture where targeted hardware have been softened.

Figure 2A:
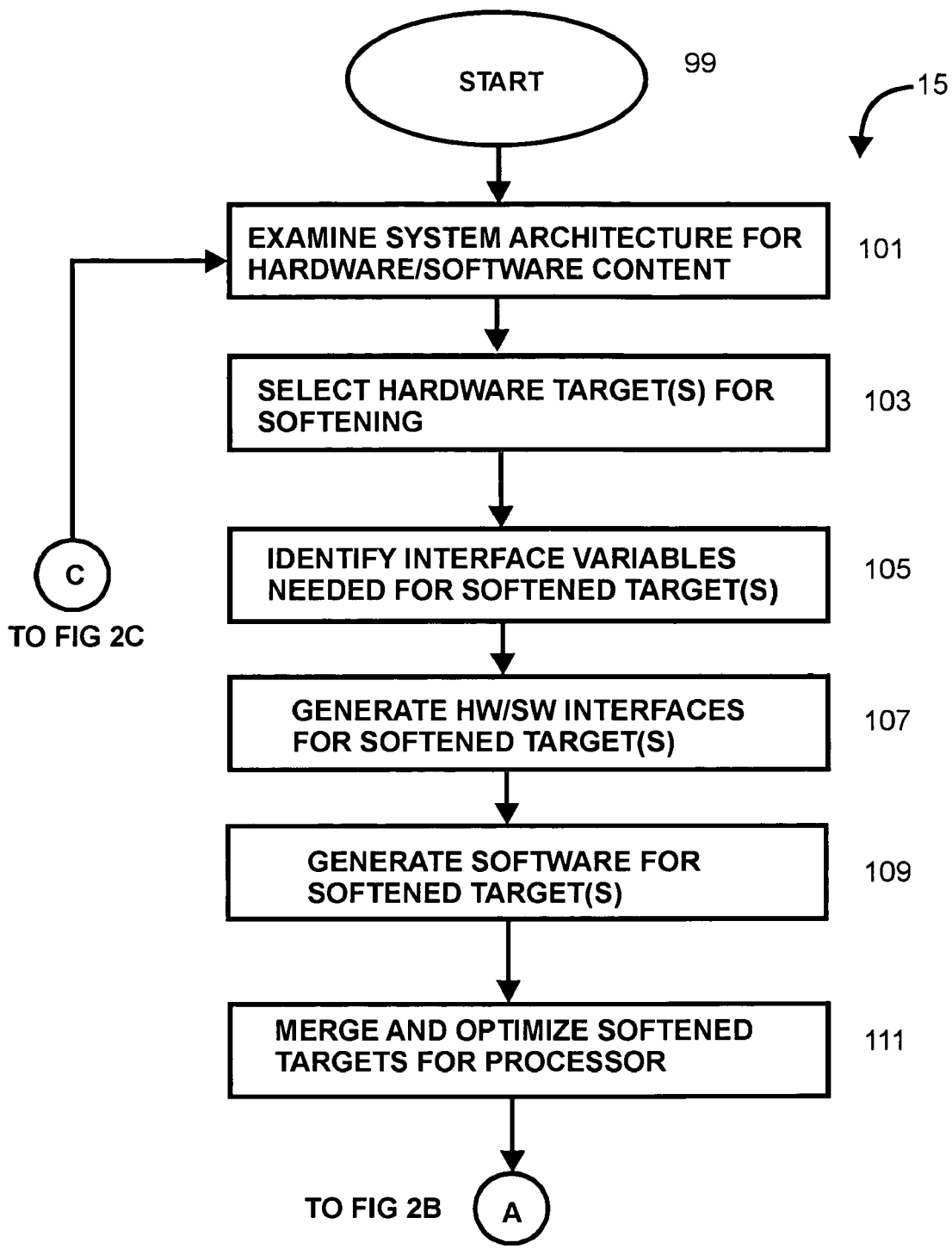
FIGS. 2A, 2B and 2C is a diagram of an exemplary softening method of the invention.
Figure 2B:
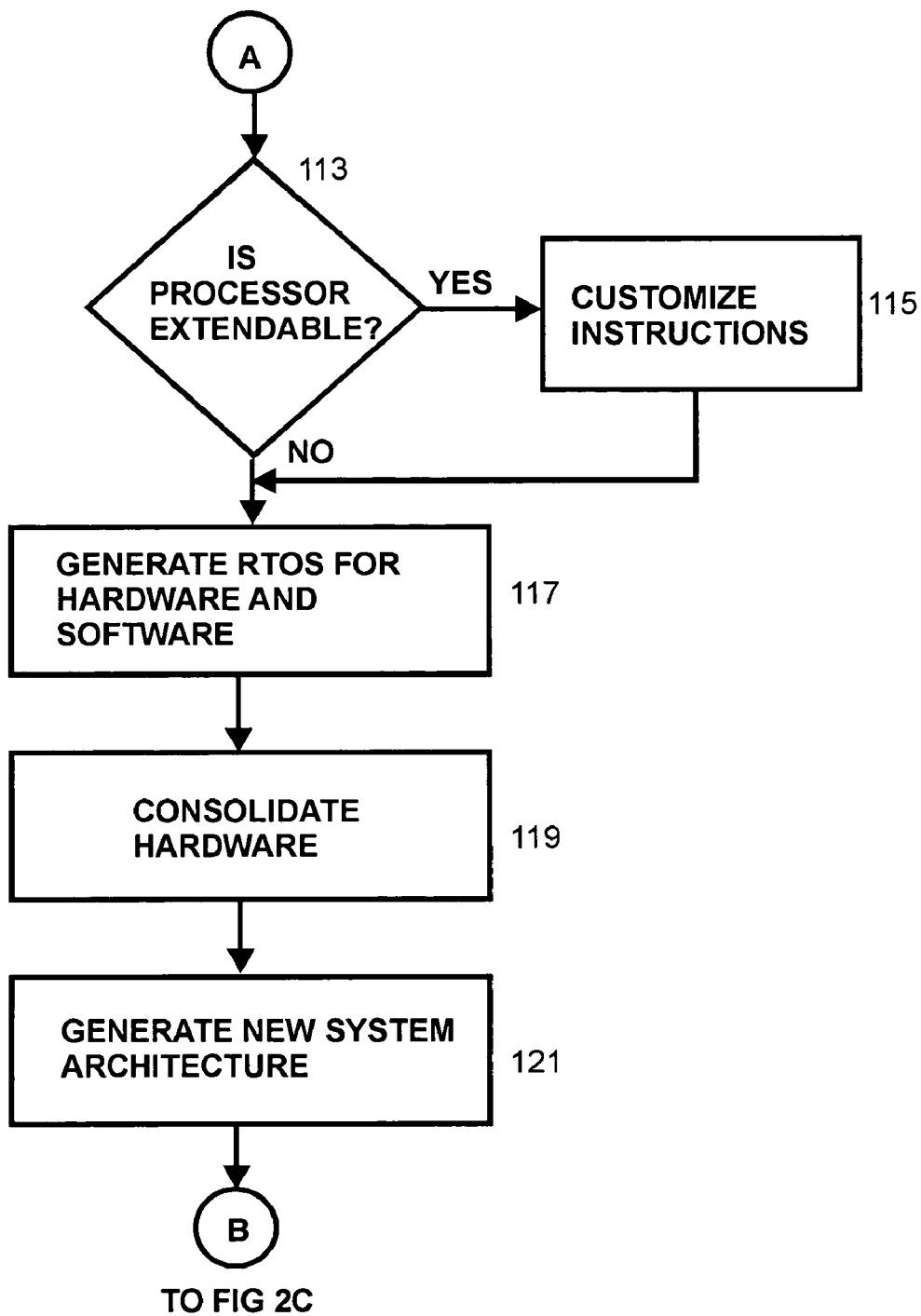
Figure 2C:
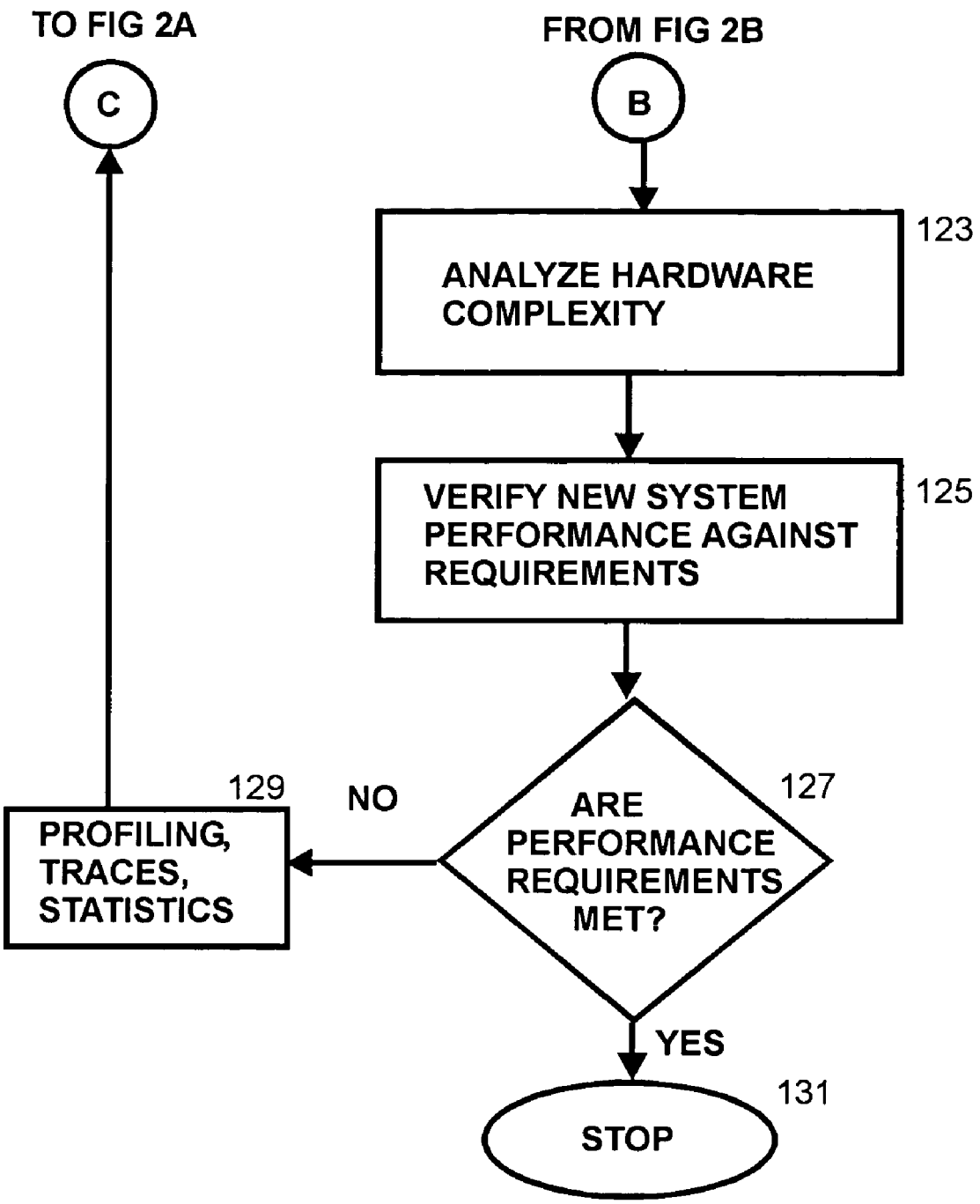

The method of the invention 15 is shown in FIGS. 2A, 2B and 2C. The invention can be used on existing system-level designs implemented only as hardware, or as hardware and software. The method begins (step 99) with a design space exploration (step 101). An existing system-level design is examined for softening a candidate hardware target or targets. A target to be softened can comprise a portion of a hardware task or a complete hardware task, and is identified and selected (step 103). A set of variables—data dependencies— that need to be communicated across the HW/SW boundary as a result of the softened target are identified (step 105). The identified target and remaining hardware are modified to incorporate HW/SW communication mechanisms (step 107) that enable the remaining hardware to communicate with the softened hardware task (that will execute as software on a processor). The softened target is converted to functionally equivalent optimized software, for example, compatible with a target embedded processor (step 109) for execution. The target processor can be one that was present in the original design and has increased availability of processing bandwidth in the new design, or a new processor that is included in the new design for the purpose of boosting the system software content.

The softened tasks are merged and optimized (step 111) to facilitate efficient scheduling on the processor. If the processor is extendable in terms of its architectural resources (register files, functional units, etc.) and/or instruction set (step 113), the instructions can be customized accordingly (step 115) improving the performance of the softened tasks. A customized HW/SW real-time operating system (RTOS) is generated for run-time arbitration among the set of pending softened tasks (step 117). Multiple softened targets may result in simultaneously pending tasks for the processor, therefore, scheduling support is needed to sequentially execute the softened tasks. The hardware portion (HW RTOS) of the HW/SW RTOS implements scheduling, the software portion (SW RTOS) is responsible for task invocation. The HW RTOS can be customized in terms of the scheduling strategy such as round robin, earliest deadline first (EDF), topological sort, and the like.

The remaining hardware is consolidated in order to maximize sharing of resources and further reduce the complexity of application specific hardware (step 119). A new system-level architecture is generated (step 121) and is subjected to simulation-based performance profiling and analysis of hardware complexity (step 123). The results are analyzed to verify if performance requirements are satisfied and if desired complexity reduction was achieved (step 125). If the performance criterion were not met (step 127), the profiles and execution traces of the new system-level description (step 129) are fed back to the design space exploration step (step 101) to enable a better optimized set of softening targets. If the performance criterion is met (step 127), the softening process can stop (step 131). One skilled in the art appreciates that the invention 15 can be implemented as executable code for execution on a computer, taking as input an existing system-level description and outputting a new system-level architecture. The steps of the invention 15 use data from the existing system-level design to create the hardware and software for the new system-level design. A detailed discussion of the method of the invention 15 follows.

Figure 3:
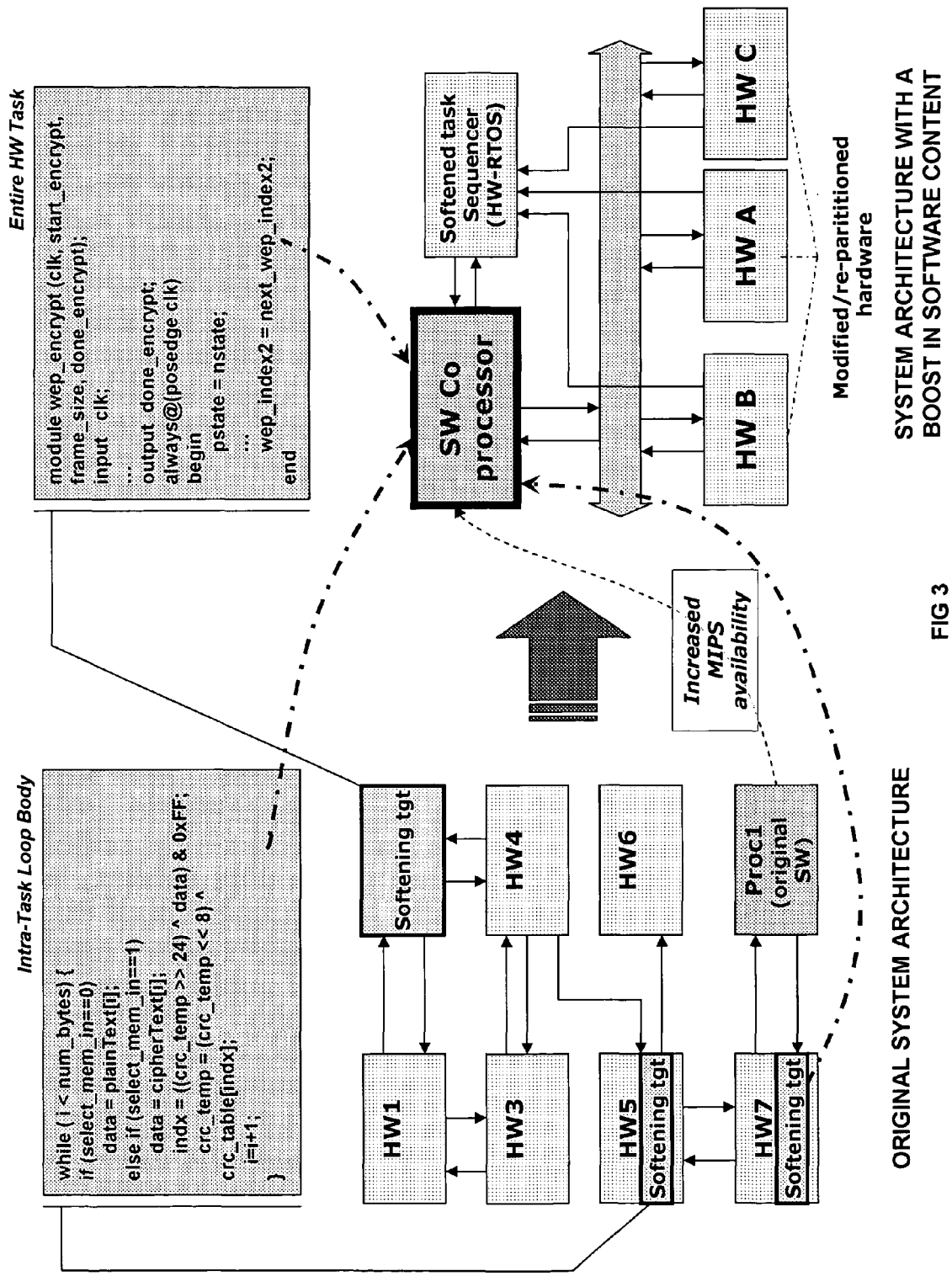
FIG. 3 contrasts an exemplary system-level architecture with a new, software boosted system-level architecture resulting from the method of the invention.

Shown in FIG. 3 is an example showing the results of the invention 15 when applied to an existing system-level design. The original system-level architecture comprises seven hardware modules HW1, HW2, HW3, HW4, HW5, HW6 and HW7 communicating with a processor Proc1 executing embedded software. Using the method 15, hardware modules HW2, HW5 and HW7 are selected as candidate targets for softening during design space exploration (step 103). Portions of the original design code for HW2 and HW5 are shown. Hardware targeted for softening can include entire hardware tasks, such as HW2 and HW7, as well as portions of other hardware tasks—intra-task loops—such as HW5. Hardware modules HW2, HW5 and HW7 are softened, in conjunction with the original system software, into software compatible for execution on a newly specified processor SW processor capable of better performance than the original system-level processor Proc1.

The remaining hardware modules HW1, HW3, HW4 and HW6 are consolidated and reemerge in the new system-level design as three new hardware module configurations HWa, HWb and HWc due to the functional absence of the targeted hardware, modules HW2, HW5 and HW7. To maintain the original system-level design specification, the new hardware modules HWa, HWb and HWc and processor SW processor communicate with each other over a bus BUS and new interfaces (not shown). Task scheduling during operation is performed via a new HW/SW RTOS (HW RTOS shown). The SW RTOS portion is executed by the processor SW processor.

Figure 4:
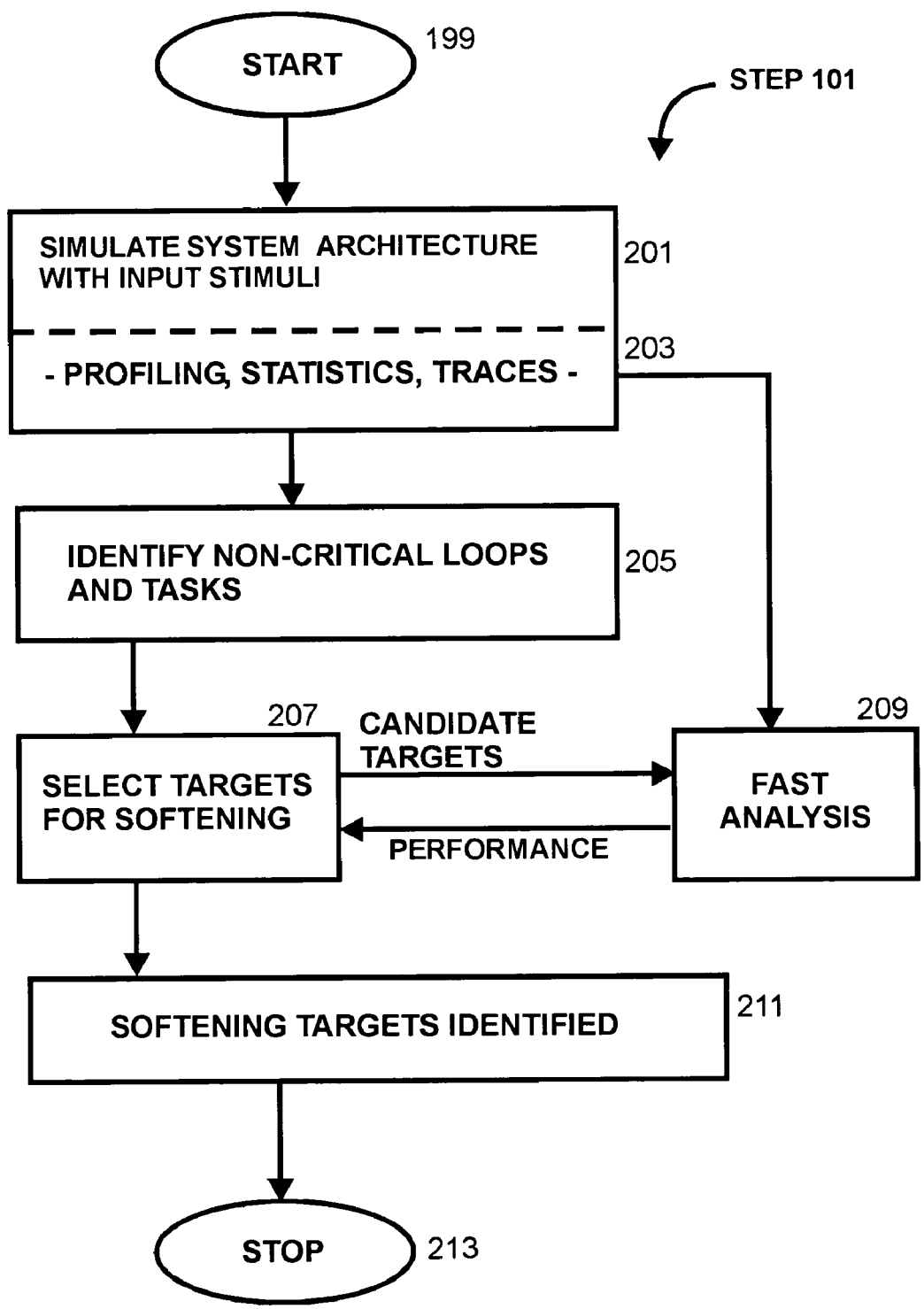
FIG. 4 is a diagram of an exemplary target selecting method of the invention.

Shown in FIG. 4 is the hardware target selection process (step 101). During design space exploration for selecting targets for softening (step 101), existing system-level hardware is simulated using a set of designer provided input stimuli that are representative of the final execution environment of the system (steps 199 and 201). Automatic profiling techniques (step 203) are used to list hardware specific tasks and/or computational loops that have little or no impact on system performance—the hardware tasks and loops that do not lie on system critical paths. The purpose of this step is to prune the search space of candidate softening alternatives by eliminating performance critical tasks and loops (step 205) from further consideration in the interest of system performance. The space of candidate softening alternatives is considered by a design space exploration procedure (step 207) which makes use of a fast analysis (step 209) to evaluate alternative solutions. The fast analysis uses a trace-based analysis where execution traces derived during profiling (step 203) are re-used to efficiently analyze the effect of softening selected targets. The trace-based analysis uses models of software performance, HW/SW communication overheads and hardware complexity to rapidly estimate system performance and area improvements when selected tasks are softened. The trace-based analysis technique is faster than simulation and permits fast exploration of the search space. The process derives a set of targets for softening (step 211) that yield maximum silicon area reduction without compromising performance and is based on a greedy search heuristic where the softening target list is incrementally constructed by examining the list of candidate solutions in increasing order of potential performance impact. When no more tasks/loops can be softened without compromising performance, the process terminates (step 213).

In an alternative embodiment, softening target identification is performed using search techniques such as Kernighan- Lin (K-L) partitioning heuristics, linear programming, genetic algorithms and simulated annealing which trade-off computational effort for optimality of the generated solution. K-L based heuristics are widely used in VLSI layout design for hypergraph partitioning in the context of decomposing linear programs. The result of the target selection process is one, or a set of hardware modules or tasks that have been modified with tokens to indicate start and end portions of functionality that will be migrated to software.

Identifying variables (step 105) that need to be communicated across the HW/SW interface is achieved using dataflow analysis techniques. Inputs to a softened task executing on the processor are those variables that are defined outside of the softened target but are read from within it. Conversely, this step also identifies variables that are updated within the softened target and are used outside of it. These variables become the outputs of the softened task.

FIG. 5A shows a hardware portion of an existing system-level description which corresponds to a cyclic redundancy check (CRC) computation in an IEEE 802.11 media access control (MAC) subsystem in which the softening target has been specified using /*SW-BEGIN*/ and /*SW-END*/ tokens. Arrow dotted lines indicate data dependences which result in the identification of variables that need to be included in the HW/SW interface. In this example, the variables noOfBytes and selectMemIn become inputs to the softened task and crc_temp becomes an output of the softened task as shown in FIG. 5B.

Figure 6:
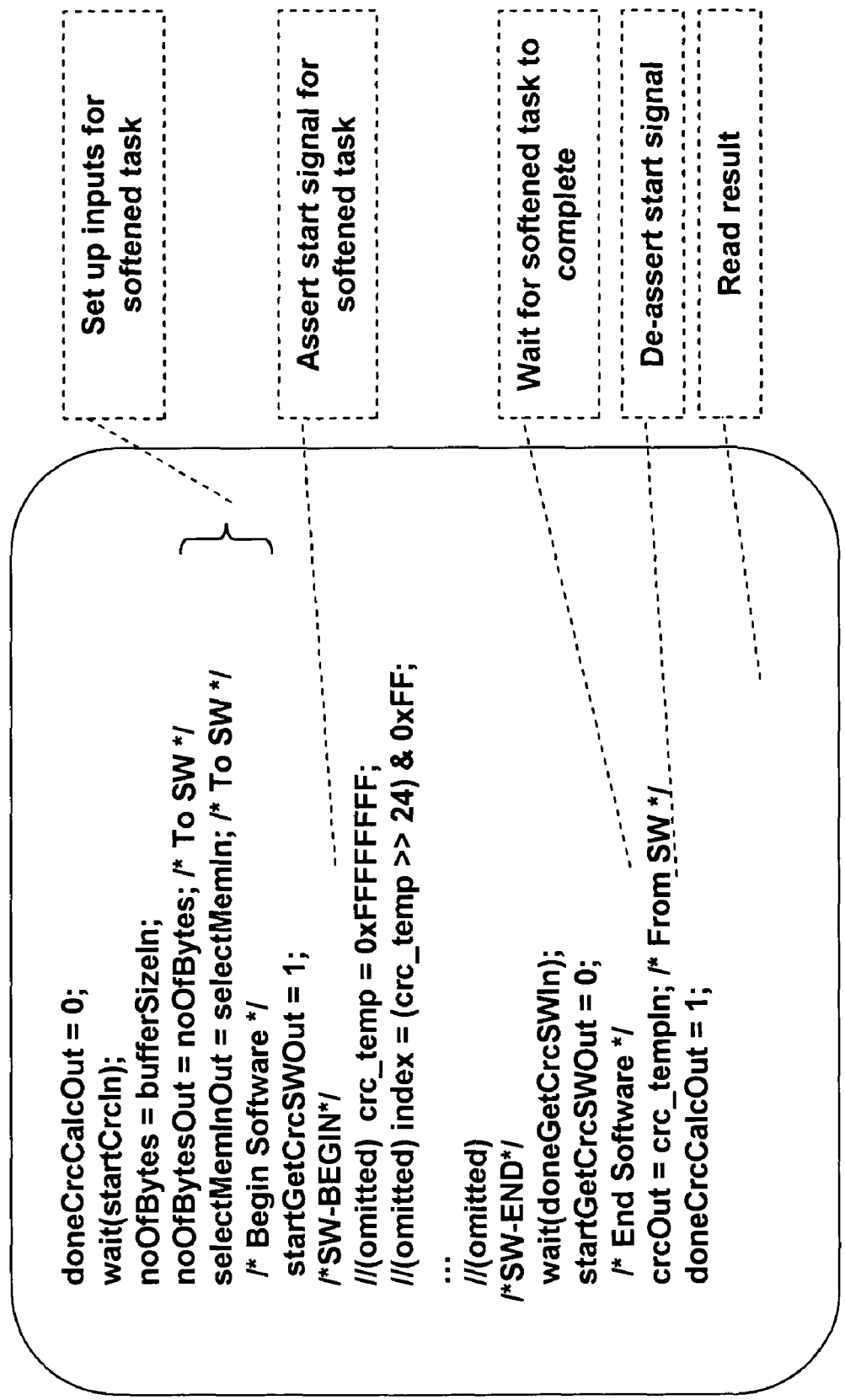
FIG. 6 is an exemplary specification of CRC hardware after CRC task softening.

Once the variables that need to be communicated across the HW/SW boundary have been identified (step 105), the original hardware description is stripped of the functionality that has been softened and enhanced with an interface that enables it to communicate with the softened task that executes on the SW processor (step 107). FIG. 5B shows the interface that corresponds to the softened target shown in FIG. 5A. FIG. 6 shows the modified hardware description that implements the interface behavior.

The part of the hardware description enclosed between /*SW-BEGIN*/ and /*SW-END*/ (shown in FIG. 5A) has been commented out and new I/O signals have been generated to exchange data with the softened task and handshake with the operating system. Two new output signals are generated at the hardware component interface—noOfBytesOut and selectMemInOut—to pass input parameters to the softened task. The startGetCrcOut signal is asserted to request the HW-RTOS to execute the corresponding softened task. Having asserted the signal, the hardware waits for the completion of the software task's execution which is indicated by the wait(doneGetCrcSWIn) signal. When this occurs, the startGetCrcOut signal is reset and the result of the software computation is returned via crc_tempIn which is used to update the internal variable crcOut. Finally, the signal doneCrcCalcOut is set high which informs the HW RTOS scheduler that the execution of the softened task has been completed.

Once the interface signals have been generated, addresses are selected for the memory-mapped hardware registers. Since communication between the hardware and the SW processor occur over a system bus, bus interface logic is automatically synthesized to connect the hardware to the bus (step 107).

During software task generation, software code that is compatible with the specified SW processor is generated starting from the identified softening target(s). Input parameters are passed from hardware to software using memory-mapped storage registers. The transformations required to generate corresponding software tasks include declaring and using pointers to refer to memory mapped registers and data memory regions. Prior to the execution of the softened task, all inputs are fetched from hardware output registers using simple I/O operations. Similarly, outputs generated by the softened task are transferred to hardware by writing the results into memory-mapped registers. Other transformations that need to be applied include removal or substitution of hardware-specific constructs such as synchronization directives and bit-level manipulations that appear in the original system-level hardware description and are not supported by a standard C compiler. FIG. 7 shows the softened task that is generated for the softened target shown in FIG. 6.

Softened target task merging and optimization (step 111) is an intermediate step that takes the software tasks that have been generated (step 109) and merges and optimizes them prior to RTOS generation (step 117) and processor customization (step 113). Merging of software tasks reduces the complexity of the operating system since it simplifies scheduling decisions. Common compiler optimizations like constant propagation and common sub-expression factoring can also be exploited and an efficient preliminary merging of tasks can boost the opportunities for optimization by allowing the compiler to analyze and control flow dependencies over longer instruction threads.

During HW consolidation (step 119), the resulting hardware partition can be further optimized. After the extraction of the selected softening targets from the original hardware portion of the design is complete, the resulting hardware partition can result in less complex hardware tasks that can be modified and merged in order to yield a new set of hardware components of reduced complexity. This step uses behavioral synthesis to simultaneously synthesize a larger number of tasks. Exposing the concurrency of the tasks fosters the possibility to share resources used in mutually exclusive execution paths. In the original hardware partition, this may not be achievable since the higher task complexity places too much demand on behavioral synthesis.

For the HW/SW RTOS (step 117), a scheduling support is generated whose purpose is to resolve at run time conflicting requests from different hardware blocks, each of which need to execute a certain softened task on the processor. As described above, to minimize consumption of processor cycles, a mixed HW/SW RTOS is generated. The HW-mapped portion implements the scheduling algorithm, the SW-mapped portion is responsible for task invocation. As shown in FIGS. 5A and 6, the hardware modules that have been softened are augmented with two additional I/O signals—Start and Done. These signals are used for handshaking with the RTOS which gathers pending requests and chooses the next software task to run based on a customizable scheduling policy. The selected task is communicated to the processor using an integer task identifier task id that is sent on the communication bus. The processor then calls the appropriate software routine based on the value of task id.

An advantage of implementing the scheduler in hardware is that the hardware has a complete view of the system. Since hardware executes faster than software, it is possible to implement some scheduling algorithms that are generally not considered in a software based RTOS. One method is topological sorting, which is a classic technique used to schedule event driven descriptions in commercial event driven simulators. Dynamic scheduling policies like EDF are rarely implemented in software due to the difficulty involved in computing deadlines. The hardware scheduler is advantageous for this purpose due to more predictable latency characteristics as compared with software, where pipeline stalls and cache misses complicate matters significantly.

Potential opportunities provided by extendable/customizable processor cores are exploited (steps 113, 115) if used. It is possible to analyze the set of instructions needed by the targets that have been softened and customize the processor core in order to provide only the architectural resources needed by the specific set of instructions. Depending on the type of softening targets, the performance improvement with respect to a solution that involves a general purpose processor core can be significant.

The results of applying the method of the invention 15 to a WPA-based IEEE 802.11 MAC processor follow. An overview of the functionality of the system is presented and the experimental methodology used. The results are presented that evaluate the impact of the proposed softening techniques on system performance and the corresponding savings in hardware complexity. Finally, the computational efficiency of the proposed techniques is listed.

The example system, an IEEE 802.11 MAC processor, implements the integrity and security functionality deemed mandatory for Wi-Fi protected access (WPA) compliance in IEEE 802.11 based systems. A brief overview of the functionality of the system follows.

Figure 8:
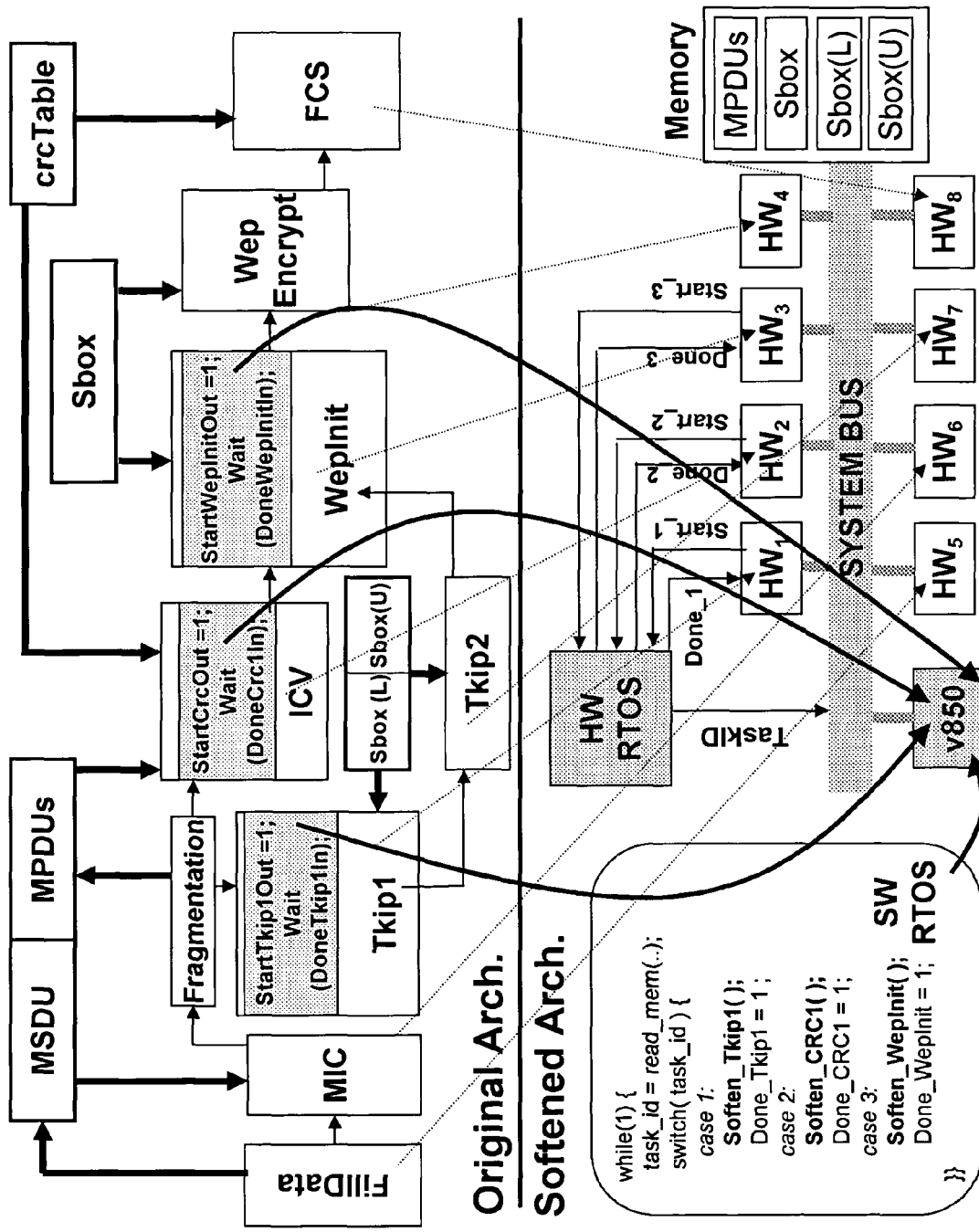
FIG. 8 is an exemplary application of the invention to an IEEE 802.11 WPA-based MAC subsystem.

The system functionality is distributed among seven communicating tasks as shown in FIG. 8. The original system architecture consists of eight dedicated hardware components: FillData, MIC, Tkip1, Fragmentation, ICV, WepInit, Wep Encrypt and FCS, and six shared memories: MSDU, MPDUs, crcTable, Sbox, Sbox(L), and Sbox(U). In this example, the original system was entirely mapped to hardware.

Data is received from a host in the form of MAC service data units (MSDUs), which may vary in size from 1300 to 2300 bytes. The MSDUs are processed by the message integrity check (MIC) task and may be fragmented into multiple MAC protocol data units (MPDUs) ranging in size from 256 to 1300 bytes. The temporal key integrity protocol (TKIP) consists of two functions: TKIP phase 1 executes once every 65536 MPDUs; TKIP phase 2 executes once every MPDU and computes an encryption key. The integrity checksum vector (ICV) task computes a 32-bit CRC on each unencrypted MPDU. In parallel with the ICV, the encryption tasks WEPINIT and WEPENCRYPT encrypt each MPDU using the Rivest cipher 4 (RC4) algorithm. Thereafter the frame checksum sequence (FCS) task computes a 32-bit CRC on the encrypted MPDU and MAC header, thereby generating a frame ready to be transmitted over a communication medium. Converse operations take place at the receiving end, except that fragmented MPDUs are aggregated to regenerate the corresponding MSDU.

Modules Tkip1, ICV and WepInit have been identified as targets for softening (step 103). Since the original system was entirely mapped to hardware, the method introduces an embedded processor. The application-specific hardware components for the new architecture are either identical to the original components, for example, FillData→HW5, MIC→HW6, Tkip2→HW7, Wep Encrypt→HW4, FCS→HW8 or simplified in cases where operations previously implemented in hardware are migrated to software Tkip1→HW1, ICV→HW2, WepInit→HW3. A new hardware component, HW-RTOS is added.

Since the hardware modules execute concurrently, at any given time the system may have several pending softened tasks to execute. Dynamic scheduling of the number of softened tasks could result in the consumption of valuable processor resources that could otherwise be devoted to executing application functionality. To maximize the migration of functionality from hardware to software, it is important to minimize the extent to which the processor is involved in performing scheduling operations.

A mixed HW/SW solution is implemented for the scheduling support. The HW RTOS component performs scheduling operations and serializes requests to the processor. A SW RTOS (illustrated by the code fragment in FIG. 8) is responsible for task invocation. The HW RTOS functions similar to an interrupt controller. However, the difference is that the scheduling policy is not fixed but is customizable. A standard interrupt controller generally implements a static priority scheduling policy. In the original and new system-level architectures, data objects that are accessed by the hardware modules selected for softening are mapped to shared on-chip memories. The memory is coupled to the bus and is addressable by the processor. The target architecture can include more than one SW processor, where each executes computations off-loaded from a set of softened hardware modules.

Figure 9:
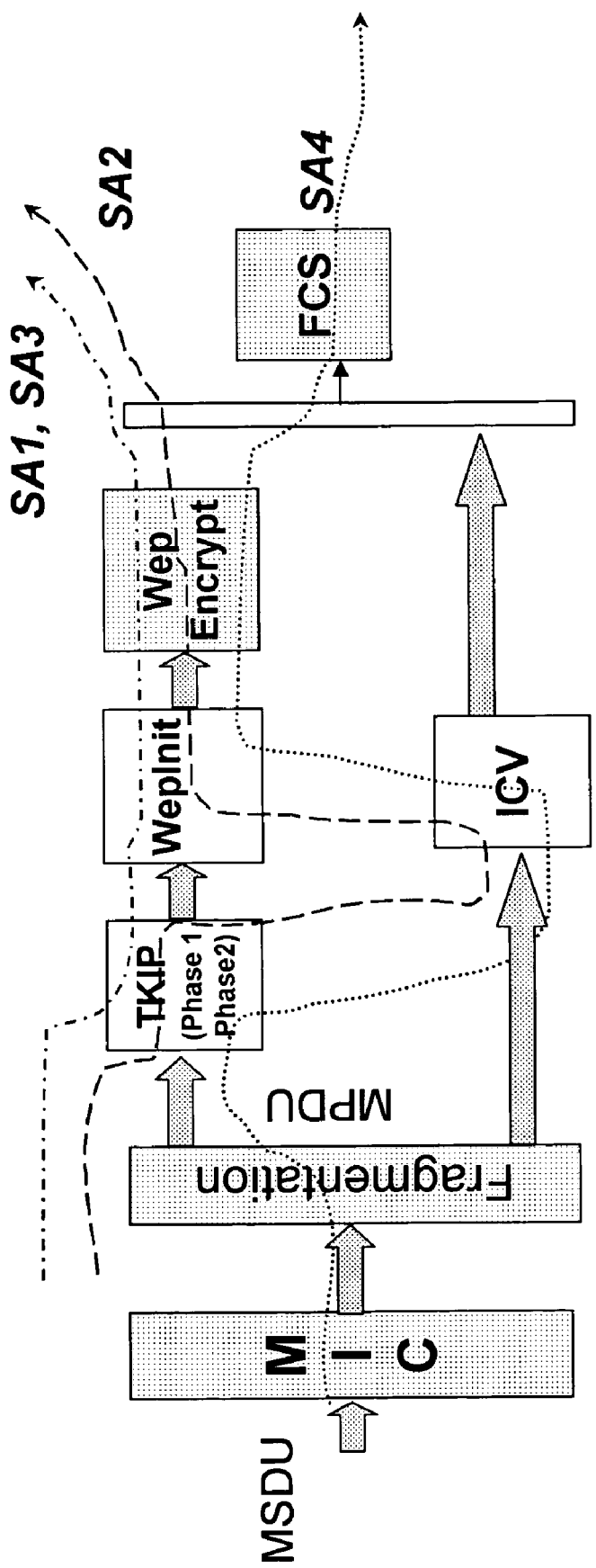
FIG. 9 is a diagram of the functional specification and architecture dependent system critical paths of the MAC processor shown in FIG. 8 showing different softening architecture alternatives.

To evaluate the method of the invention, the WPA-based IEEE 802.11 MAC processor was first implemented at the cycle-accurate functional level using a commercial C-based hardware design flow with dedicated hardware units for each of the functions described in the previous subsection. The hardware system-level architecture (which is the starting point for the method of the invention) is shown in FIG. 9. The method was implemented and integrated with this design flow. An NEC v850 processor was specified and used as the SW processor. A commercial cycle-accurate HW/SW architectural simulator was used to drive selection of the softening targets and for the large number of experiments that were performed to analyze the resulting systems, which span the trade-off space between flexibility and performance. In cases where multiple blocks were softened, a round-robin scheduling strategy was used by the HW-RTOS. The system clock frequency for all experiments was set at 300 MHz, and the data rate requirement of the system was 50 Mbps. For accurate area measurements, a commercial behavioral synthesis tool and Synopsys Design Compiler were used. Area savings were measured at the gate-level using a commercial 0.15 µm standard cell library.

The first set of experiments compares the performance impact when different tasks of the MAC processor are softened, and the corresponding savings achieved in terms of hardware complexity. The critical paths for four softened architectures (SAx) are shown in FIG. 9. SA1 softens MIC, TKIP Phase1, TKIP Phase2 and FCS, SA2 softens MIC, TKIP Phase1, TKIP Phase2 and ICV, SA3 softens TKIP Phase1, TKIP Phase2, and WEP_Init, and SA4 softens all functional blocks.

FIG. 10 shows a table listing different softening alternatives, including cases where individual as well as a collection of hardware blocks are softened. Column 2 indicates the corresponding reductions achieved in application-specific hardware complexity, columns 3 and 4 indicate the performance impact of softening on individual tasks, and column 5 indicates the performance impact on the overall system.

From the table, the softening of system hardware may have significantly variable impact on the performance of individual blocks. For example, softening causes a 33× slowdown for TKIP phase 1, but only a 4× slowdown for ICV. While this is an important metric to consider when selecting which blocks to soften, it is more important to examine the impact of this slowdown from a system-level standpoint. The results further indicate that in spite of significant deterioration in the performance of specific tasks, overall system performance is often relatively immune to softening. In this example, softening the MIC, ICV and TKIP tasks have no impact on system performance. The results also demonstrate the relatively small impact when multiple blocks are judiciously selected (SA1 through SA3), and the relatively large impact where a poor selection (SA4) is made. The significant number of solutions can be found where in spite of softening, the system is capable of satisfying the 50 Mbps requirement. These results can be explained by analyzing the critical paths in the system functionality which varies depending on the exact set of tasks that are softened. Additionally, the softening can achieve substantial savings in terms of hardware complexity. On average, architectures SA1 through SA3 achieve 66% savings in the complexity of application-specific hardware used in the design.

Figure 11:
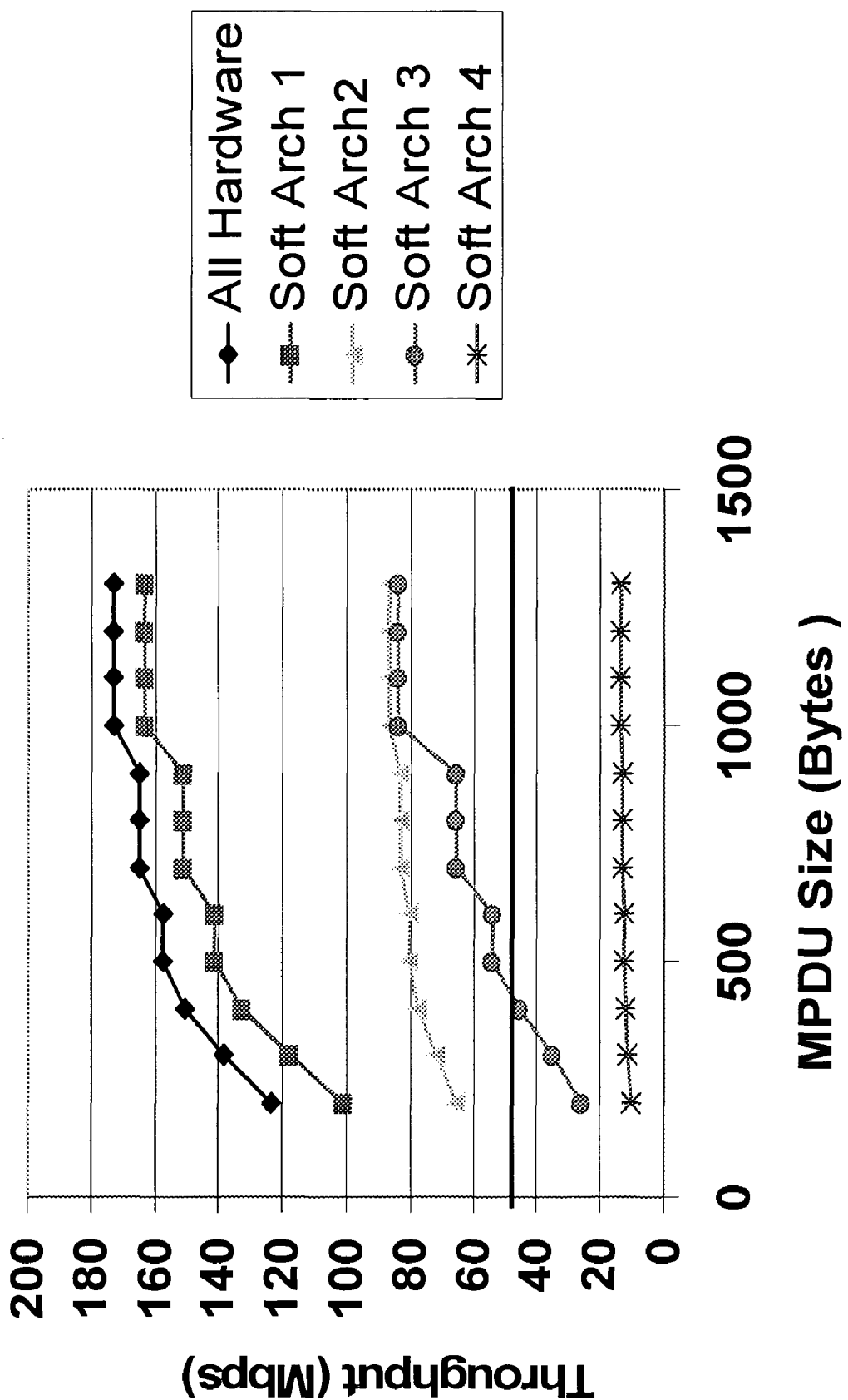
FIG. 11 is a plot showing the variation of throughput for the different softening alternatives.

The overall system performance is also determined by the characteristics of the input traffic. From the above results, since SA1 through SA3 appear to be good candidate softened architectures, the next experiment evaluates the ability to satisfy performance requirements across varying MPDU sizes. The results of this experiment are plotted in FIG. 11. From these results, while SA1 and SA2 are capable of satisfying the 50 Mbps requirement at all frame sizes, SA3 fails to do so for frame sizes below 450 bytes.

From the above results, it is shown that significant opportunities exist for softening in complex designs and result in substantial savings in hardware complexity. The large boost in the fraction of system functionality that is converted to software does not compromise overall performance. The results also show that the proposed methodology facilitates experimentation with different softening alternatives and the selection of an optimized set of softening targets.

FIG. 12 shows the measurements of CPU time consumed in generating the four candidate softened architectures. All the measurements were performed on a Dell PowerEdge server with a 2.8 GHz Intel Xeon processor and 4 GB RAM. The column labeled SOFTENIT refers to the time taken to execute the invention 15 (steps 99-131, steps 199-213). The total time includes the softening time and the software compile time and varies depending on the number of softened tasks. In all cases, the time taken is less than a minute.

In comparison, the time taken by an experienced designer to manually construct a new system-level description from an existing system-level description when provided the selection of softening targets for the MAC processor system is typically in excess of two days. From these results the proposed methodology is computationally efficient, and thereby facilitates fast exploration of numerous softening alternatives in a short span of time. To put these results into perspective, the time consumed in generating hardware for the blocks that were chosen to be softened includes the time spent in performing behavioral and logic synthesis. While this is up to 30× slower than the softening process, the actual CPU time spent in hardware design would in practice be significantly higher owing to the large computational effort consumed by back-end tools for physical design (automatic place and route, full chip timing analysis, etc.).

A shift toward software helps reduce time to market, increase the opportunities for design reuse, increase flexibility, and reduce cost. Given a system that was previously designed for certain performance constraints and hardware capabilities, under a revised version of the same design, numerous alternatives for migrating system functionality from hardware to software often emerge due to increased availability of processing bandwidth. Application of the proposed flow to a hardware-dominated design of an IEEE 802.11 MAC subsystem demonstrated that the flow enables optimized selection of softening targets resulting in significant reductions in application-specific logic while satisfying performance constraints.

The large number of legacy designs will make it important to support transformation of detailed structural register transfer language (RTL) hardware descriptions into optimized software running on a processor. The recent emergence of configurable embedded processors raises the possibility of addressing the performance impact issue (when functionality is migrated from hardware to software) through automatic instruction set customization techniques. Increasing system complexity implies that the potential number of softening alternatives may be huge, requiring efficient search techniques for exploring the design space of softening target selection. Finally, for SoCs containing large number of softening targets and more than one processor, multiple SW processor based solutions would need to be developed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for creating a new system-level design for an existing system-level design, comprising:
migrating hardware functionality present in the existing system-level design to software in the new system-level design;
examining the existing system-level design for hardware targets;
selecting at least one hardware target using a processor;
identifying interface variables for said selected hardware target and remaining existing system-level design hardware; and
softening said selected hardware target for execution on at least one processor for the new system-level design,
wherein said hardware functionality is softened into software using the identified interface variable in conjunction with original system software that is compatible for execution on a processor.

2. The method according to claim 1 further comprising consolidating said remaining existing system-level design hardware into new system-level design hardware.

3. The method according to claim 2 further comprising generating a communication interface for the new system-level design to permit said softened target to communicate with said new system-level design hardware.

4. The method according to claim 3 further comprising generating a hardware scheduler for said new system-level design hardware for sequencing the execution of said soften target with said new system-level design hardware.

5. The method according to claim 4 further comprising generating a software scheduler for said new system-level design processor for sequencing the execution of said softened target with said new system-level design hardware.

6. The method according to claim 5 further comprising generating a mixed hardware/software scheduler for the new system-level design for sequencing the execution of said softened target with said new system-level design hardware.

7. The method according to claim 5 further comprising merging said softened target with new system-level design software.

8. The method according to claim 7 further comprising customizing said at least one processor executing said softened target.

9. The method according to claim 8 further comprising verifying the performance of the new system-level design based upon metrics for the existing system-level design.

* * * * *